United States Patent
Ohashi (10) Patent No.: US 11,273,374 B2
(45) Date of Patent: Mar. 15, 2022

(54) INFORMATION PROCESSING SYSTEM, PLAYER-SIDE APPARATUS CONTROL METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 6 days.

(21) Appl. No.: 16/623,507

(22) PCT Filed: Jun. 27, 2018

(86) PCT No.: PCT/JP2018/024430
§ 371 (c)(1),
(2) Date: Dec. 17, 2019

(87) PCT Pub. No.: WO2019/009163
PCT Pub. Date: Jan. 10, 2019

(65) Prior Publication Data
US 2021/0146246 A1    May 20, 2021

(30) Foreign Application Priority Data
Jul. 4, 2017   (JP) .............................. JP2017-131410

(51) Int. Cl.
*A63F 13/52* (2014.01)
*A63F 13/25* (2014.01)
*A63F 13/79* (2014.01)

(52) U.S. Cl.
CPC .............. *A63F 13/52* (2014.09); *A63F 13/25* (2014.09); *A63F 13/79* (2014.09); *A63F 2300/8082* (2013.01)

(58) Field of Classification Search
CPC ........... A63F 13/52; A63F 13/25; A63F 13/79
See application file for complete search history.

(56) References Cited

U.S. PATENT DOCUMENTS

| | | | |
|---|---|---|---|
| 2003/0156144 A1 | 8/2003 | Morita | |
| 2013/0222215 A1 | 10/2013 | Shibata et al. | |
| 2014/0125558 A1* | 5/2014 | Miyajima | G09B 7/02 345/8 |
| 2014/0368542 A1* | 12/2014 | Tawara | G06T 19/006 345/633 |

FOREIGN PATENT DOCUMENTS

| | | |
|---|---|---|
| JP | 2000-353248 A | 12/2000 |
| JP | 2003-242527 A | 8/2003 |

(Continued)

OTHER PUBLICATIONS

Roblox How to add team only items, https://www.youtube.com/watch?v=5KBlnoMlzQk, published on Jun. 2, 2017, screenshot in RobloxHowToAddTeamOnlyItems.pdf (Year: 2017).*

(Continued)

*Primary Examiner* — Yingchuan Zhang
(74) *Attorney, Agent, or Firm* — Katten Muchin Rosenman LLP (57) ABSTRACT

The type of virtual object to be presented to each player is determined based on player attribute information prescribed for each player.

8 Claims, 4 Drawing Sheets

| PLAYER IDENTIFIER | DISPLAY APPARATUS IDENTIFICATION INFORMATION | GROUP IDENTIFIER |
|---|---|---|
| aaaa | cccc | A |
| bbbb | dddd | B |
| ⋮ | ⋮ | ⋮ |

(56) References Cited

FOREIGN PATENT DOCUMENTS

| JP | 2013-178639 A | 9/2013 |
| JP | 2014-093050 A | 5/2014 |
| JP | 2015-001875 A | 1/2015 |
| JP | 2017-062720 A | 3/2017 |

OTHER PUBLICATIONS

Notice of Reasons for Refusal dated Sep. 29, 2020, from JP Application No. 2019-527654, 4 sheets.
International Preliminary Report on Patentability dated Jan. 7, 2020, from International Application No. PCT/JP2018/024430, 14 sheets.
International Search Report and Written Opinion dated Sep. 18, 2018, from International Application No. PCT/JP2018/024430, 8 sheets.

* cited by examiner

INFORMATION PROCESSING SYSTEM, PLAYER-SIDE APPARATUS CONTROL METHOD, AND PROGRAM

TECHNICAL FIELD

The present invention relates to an information processing system, a player-side apparatus, a control method, and a program.

BACKGROUND ART

In recent years, virtual reality (VR) devices are widespread. In some cases, the VR devices are used, for example, for attractions at amusement facilities. For example, in attractions based on the use of the VR devices, a player plays while viewing an image in a virtual space different from a real space or while viewing an image in the virtual space as well as an image in the real space. When, for example, a virtual object representing a rope is disposed at a position within a virtual space that corresponds to a floor surface in a real space, and an image presented to a player looks as if the player standing at that position is looking down from a high place such as a rooftop of a building, attractions are presented so that the player feels as if the player is walking a tightrope.

SUMMARY

Technical Problems

However, when attractions involve the use of VR devices (so-called opaque VR devices) for viewing only a virtual space image in a case where a plurality of players gather for example, at an amusement facility and simultaneously play while moving in a real space, it is necessary to prevent the players from colliding with each other.

Further, if a virtual object necessary for playing is disposed in a virtual space corresponding to a predetermined position in a real space in a case where the employed VR devices present a virtual space image as well as a real space image, all the players attempt to use the virtual object. Therefore, many players gather around the object to cause a congestion.

The present invention has been made in view of the above circumstances. An object of the present invention is to provide an information processing system, a player-side apparatus, a control method, and a program that are capable of solving problems occurring in a case where a plurality of players are involved.

Solution to Problems

In order to solve the above conventional problems, the present invention includes three-dimensional information generation means for generating three-dimensional information indicative of a virtual object disposed in a virtual space, means for rendering, for each of players, a virtual space image represented by the generated three-dimensional information and generating a field-of-view image for each of the players, and means for presenting the field-of-view image for each of the players to the associated player. A type of the virtual object included in the generated three-dimensional information is determined based on attribute information prescribed for each of the players.

Advantageous Effect of Invention

The present invention makes it possible to solve the problems occurring in a case where a plurality of players are involved.

DESCRIPTION OF EMBODIMENT

Figure 1:
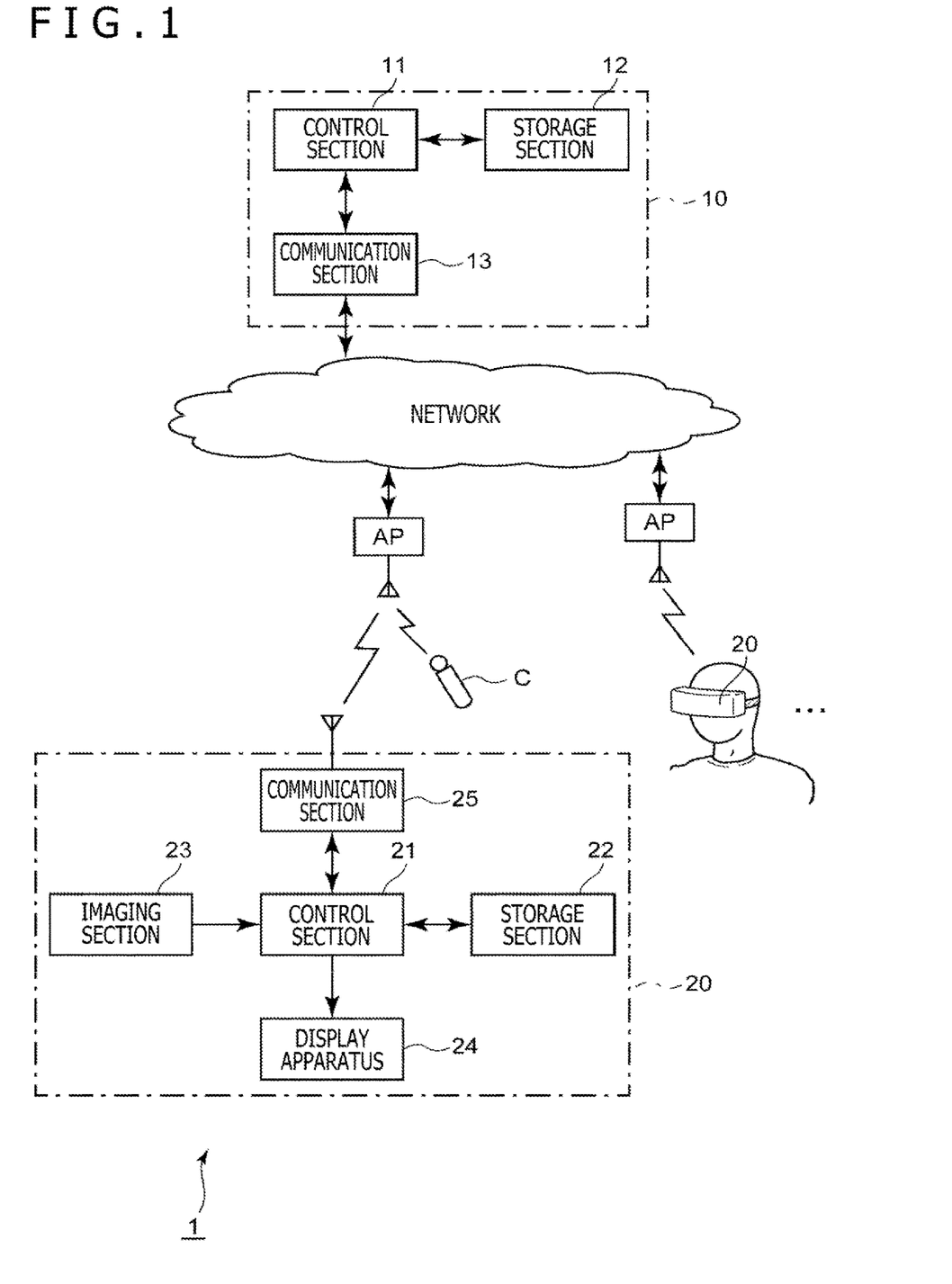
FIG. 1 is a block diagram illustrating an exemplary configuration of an information processing system 1 according to an embodiment of the present invention.

An embodiment of the present invention will now be described with reference to the accompanying drawings. As illustrated in FIG. 1, an information processing system 1 according to the embodiment of the present invention includes a server apparatus 10 and a player-side apparatus 20. The player-side apparatus 20 is owned by each player, worn, for example, on the head of each player, and includes a display apparatus 24 used to present an image to each player. The following description of the present embodiment assumes that the information processing system 1 is used in a predetermined facility, and that the server apparatus 10 is further connected to a manager terminal 30. However, the present embodiment may be not only used in a facility but also used for services that are widely provided in a predetermined area or, for example, in a specific region within a predetermined country.

As illustrated in FIG. 1, the server apparatus 10 of the information processing system 1 according to the present embodiment includes a control section 11, a storage section 12, and a communication section 13. The player-side apparatus 20 includes a control section 21, a storage section 22, an imaging section 23, the display apparatus 24, and a communication section 25. The manager terminal 30 is, for example, a common personal computer, and used to instruct the server apparatus 10 to perform setup on the participation and withdrawal of players. Further, in the present embodiment, any one of a plurality of the player-side apparatuses 20 may function as the server apparatus 10. In such a case, the control section 21 of the player-side apparatus 20 functioning as the server apparatus 10 additionally operates as the control section 11.

The control section 11 of the server apparatus 10 is a central processing unit (CPU) or other program control device that operates in accordance with a program stored in the storage section 12. In the present example of the present embodiment, the control section 11 receives, from the player-side apparatus 20, information regarding a thing in a real space, such as image data captured by the imaging section 23 of the player-side apparatus 20. Further, based on the information regarding the thing (e.g., a real space image), the control section 11 generates three-dimensional information regarding a disposed virtual object. In a certain example of the present embodiment, the control section 11 generates, based on a real space image, three-dimensional information regarding a virtual object disposed in a virtual space in correspondence with a target in a real space (a virtual object to be displayed instead of the target) that is included in the real space image. In another example of the present embodiment, the control section 11 acquires information regarding the position of a thing as the information regarding a thing, and uses the acquired information to generate three-dimensional information regarding a virtual object disposed in correspondence with a target in the real space. Furthermore, the control section 11 may generate three-dimensional information regarding not only a virtual object disposed in the virtual space in correspondence with a target in the real space but also a virtual object that is irrelevant to a target in the real space and disposed in the virtual space.

As regards a player or a person in a real space other than the player (hereinafter referred to as the player or other person), the control section 11 additionally acquires, for example, position information regarding the player or other person in the real space as one item of information regarding things in the real space. Moreover, based on the acquired position information, the control section 11 computes the location of the player (e.g., positions corresponding to those of left and right eyes of the player), renders a virtual space image that is represented by the three-dimensional information as viewed from the location in the virtual space, generates a field-of-view image regarding the player, and outputs the generated field-of-view image to the player-side apparatus 20 owned by the player. In the present example, the field-of-view image may include a left-eye image and a right-eye image for a user.

For simplicity of explanation, the following description deals with an example in which a real space image and the position information regarding a thing in a real space (including the player or other person) are used as the information regarding a thing in the real space. However, the present embodiment is not limited to such an example. The information regarding a thing in the real space may include information regarding the posture of the whole or part of the thing (e.g., a joint), such as rotational position and angle, in addition to mass, speed, and acceleration.

Further, when generating the three-dimensional information in the present example of the present embodiment, the control section 11 determines, based on attribute information regarding a player, the type of a virtual object corresponding to a target in a real space on an individual player basis. It is assumed that the attribute information is preset for each player. Operations of the control section 11 will be described in detail later.

The storage section 12 stores a program that is to be executed by the control section 11. The program may be supplied on a computer-readable non-transitory recording medium and stored in the storage section 12. Further, the storage section 12 additionally operates as a work memory of the control section 11. The communication section 13 is, for example, a network interface, and used to communicate with the player-side apparatus 20 worn by each player and a player-operated controller C via a network or other communication link for purposes of transmitting and receiving various information.

More specifically, in an example of the present embodiment, the communication section 13 communicates with wireless access points AP disposed at various locations within a facility (a real space targeted for processing) via a local area network (LAN) or the Internet, and wirelessly transmits, via the wireless access points AP, the information to be delivered to each player-side apparatus 20.

Further, the communication section 13 receives, from the wireless access points AP, the information transmitted from the player-side apparatus 20 and player-operated controller C positioned within a wireless access point communication range, and outputs the information to the control section 11.

The present example assumes that the wireless access points AP are used. However, the communication section 13 may wirelessly communicate with each player-side apparatus 20 by using, for example, a mobile telecommunications network.

The player-side apparatus 20 is worn on the head of a user, and the imaging section 23 is disposed on the front of the player-side apparatus 20 (disposed on a side facing the eyes of the user). The control section 21 of the player-side apparatus 20 is a CPU or other program control device that operates in accordance with a program stored in the storage section 22. In the present example of the present embodiment, the control section 21 receives field-of-view image data, which is transmitted from the server apparatus 10, and causes the display apparatus 24 to display the received field-of-view image data. Further, the control section 21 controls the imaging section 23 so as to capture an image within the field of view of the imaging section 23 at predetermined time intervals (e.g., periodically at 1-second intervals), acquires image data captured by such an imaging operation, and transmits the acquired image data to the server apparatus 10 via the communication section 25.

The storage section 22 stores a program that is to be executed by the control section 21. The program may be supplied on a computer-readable non-transitory recording medium and stored in the storage section 22. Further, the storage section 22 additionally operates as a work memory of the control section 21.

The imaging section 23 is a camera that captures an image within a predetermined field of view forward of the user (forward of the head) in accordance with an instruction inputted from the control section 21, generates image data representative of the captured image, and outputs the generated image data to the control section 21. The display apparatus 24 displays field-of-view images appropriate for the left and right eyes of the user in front of the respective eyes of the user. More specifically, the display apparatus 24 includes a display element, such as an organic electroluminescence (EL) display panel or a liquid-crystal display panel, and the display element displays video in accordance with an instruction inputted from the control section 21. The display element may be a single display element for displaying a left-eye image and a right-eye image in a row or a pair of display elements for independently displaying a left-eye image and a right-eye image. The display apparatus 24 of the player-side apparatus 20 may be a transparent display apparatus or an opaque display apparatus that does not permit the user to view the outside world.

Further, in an example of the present embodiment, the display apparatus 24 is not limited to an apparatus worn on the head of the user, and may be a smartphone, a tablet terminal, or other mobile terminal owned by the user. In another example of the present embodiment, the display apparatus 24 need not be owned by the user, and may be a display, a digital signage display, or other display apparatus installed at a place where the displayed content is viewable by the user.

The communication section 25 is, for example, a wireless network interface, and used to communicate with the server apparatus 10 via a wireless network or other communication link for purposes of transmitting and receiving various information.

Figure 2:
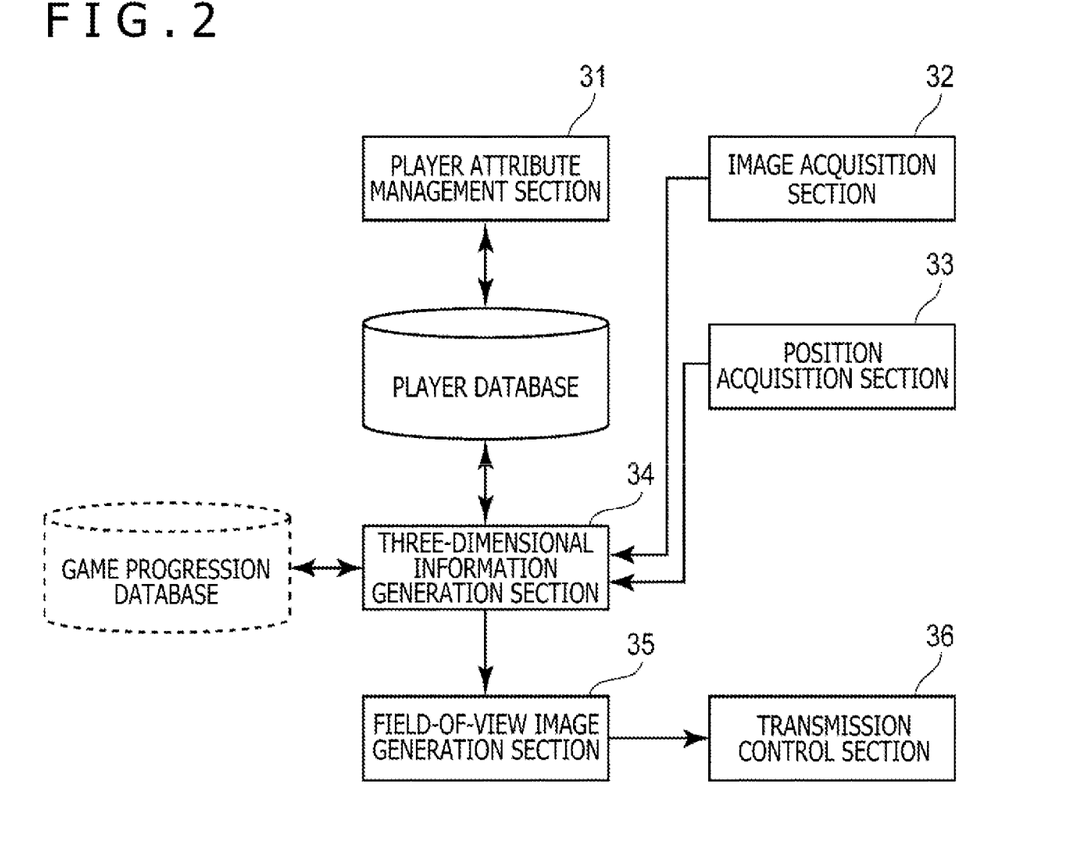
FIG. 2 is a functional block diagram illustrating an example of a server apparatus 10 according to the embodiment of the present invention.

Operations of the control section 11 of the server apparatus 10 in the present embodiment will now be described. In the present example of the present embodiment, the control section 11 includes, as illustrated in FIG. 2, a player attribute management section 31, an image acquisition section 32, a position acquisition section 33, a three-dimensional information generation section 34, a field-of-view image generation section 35, and a transmission control section 36.

Figure 3:
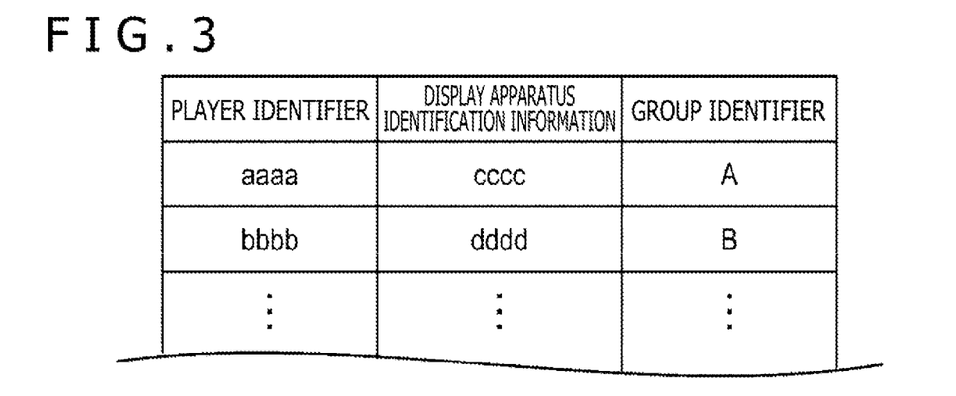
FIG. 3 is a diagram illustrating exemplary contents of a player database used in the information processing system 1 according to the embodiment of the present invention.

The player attribute management section 31 is connected to a player database that retains player attribute information regarding each player. The player database may be retained in an external database server and communicatively connected or may be stored in the storage section 12. In an example of the present embodiment, the player database stores, as illustrated in FIG. 3, a player identifier (PID), display apparatus identification information (DID), and a group identifier (GID) in association with each other as the player attribute information regarding each player. The player identifier is uniquely set for each player. The display apparatus identification information identifies the player-side apparatus 20 worn by a player identified by the player identifier. The group identifier identifies a group to which the associated player belongs.

The player attribute management section 31 receives, from the manager terminal 30, the input of an instruction indicative of the participation of a new player. The instruction includes the display apparatus identification information identifying the player-side apparatus 20 worn by the newly participating player and the player identifier of another player who is to belong to the same group as the newly participating player (this player identifier is set to "null" if no other player is to belong to the same group).

If the player identifier included in the instruction indicative of the participation of the new player is "null," the player attribute management section 31 issues a unique group identifier. Further, the player attribute management section 31 issues a unique player identifier, and registers the issued player identifier, the inputted display apparatus identification information, and the issued group identifier in the player database in association with each other.

Meanwhile, if the player identifier included in the instruction indicative of the participation of the new player is not "null," the player attribute management section 31 references the player database and reads a group identifier associated with the player identifier included in the instruction. The player attribute management section 31 then issues a unique player identifier, and registers the issued player identifier, the inputted display apparatus identification information, and the read group identifier in the player database in association with each other.

The player attribute management section 31 may transmit the issued player identifier to the manager terminal 30 for display or other processing purposes. This makes it possible to set the same group identifier for participating players belonging, for example, to the same family or organization.

Moreover, the player attribute management section 31 receives, from the manager terminal 30, the input of an instruction indicative of the withdrawal of a player. The instruction includes, for example, the display apparatus identification information identifying the player-side apparatus 20 worn by the withdrawing player (or the player identifier of the withdrawing player). Upon receiving the input of the instruction indicative of the withdrawal of a player, the player attribute management section 31 deletes, from the player database, the display apparatus identification information (or player identifier) associated with the player identifier included in the instruction as well as information associated with the display apparatus identification information.

In the present example, in response to a request from a visitor entering a facility where the information processing system 1 according to the present embodiment is installed, a manager of the facility lends the player-side apparatus 20 to the visitor, and enters, into the manager terminal 30, the display apparatus identification information unique to each player-side apparatus 20, which is set for the lent player-side apparatus 20, and causes the issuance of an instruction indicative of the participation of a new player. The display apparatus identification information unique to each player-side apparatus 20 may be, for example, a network address that is set for the communication section 25 of the player-side apparatus 20.

The image acquisition section 32 acquires, from the player-side apparatus 20 worn by each player, image data (a real space image) captured by the imaging section 23 included in the player-side apparatus 20. The position acquisition section 33 acquires information indicative of the position and orientation of each player. In a case where the information processing system 1 according to the present embodiment is installed in a predetermined facility as indicated in the present example, the acquired information indicative of the position indicates a position within the facility, and this position information is expressed in a global coordinate system indicative of a position within a real space that is to be processed by the information processing system 1. If the information processing system 1 according to the present embodiment is used on a public road or other locations not managed by a manager of the server apparatus 10, this position information may be information indicative, for example, of latitude, longitude, and altitude.

In an example of the present embodiment, the position information regarding each player may be acquired based on an image acquired by the image acquisition section 32 (for example, the simultaneous localization and mapping (SLAM) technology may be used). In another example of the present embodiment, this position information may be acquired by a global positioning system (GPS) or other positioning system through the use, for example, of a mobile phone possessed by each player. In still another example of the present embodiment, a tag for transmitting a beacon for proximity communication may be disposed at various places within the facility in order to detect a position in accordance with the beacon received from the tag and its intensity, and the orientation of a player may be detected by detecting the posture of the player with a tilt or orientation sensor (not depicted) attached to the player-side apparatus 20. Various methods are available to acquire the information indicative of the position and orientation of a player. Therefore, further details are not given here.

Based on a real space image that is acquired by the image acquisition section 32 from the player-side apparatus 20 worn by each player, the three-dimensional information generation section 34 generates three-dimensional information representative of a virtual space including a virtual object corresponding to a target that is positioned in a real space and included in the real space image. Stated differently, based on the real space image acquired from the player-side apparatus 20 worn by each player, the three-dimensional information generation section 34 generates the three-dimensional information that serves as a source for an image to be presented to the player-side apparatus 20 of each player. More specifically, the three-dimensional information generation section 34 regards the real space image acquired from the player-side apparatus 20 worn by a player as a processing target image, and processes the processing target image as described below. That is, the three-dimensional information generation section 34 not only recognizes targets (e.g., buildings, signboards, door fixtures, and other persons) included in the processing target image, but also recognizes, for example, the shapes and postures of the targets.

In a case where the information processing system 1 is used, for example, in a facility as indicated in the present example of the present embodiment, a computer-readable code image (e.g., two-dimensional bar code) may be attached in advance to a building, a signboard, or other fixture so as to let the three-dimensional information generation section 34 detect the code image from the processing target image and recognize the fixture. In such a case, when unique identification information is preassigned to each fixture, it is possible to retain shape and other information beforehand as database and allow the three-dimensional information generation section 34 to acquire and use such databased information.

Further, in a case where the information processing system 1 according to the present embodiment is used, for example, on a public road or other locations not managed by the manager of the server apparatus 10 while no computer-readable code image is attached to a building, a signboard, or other fixture, the three-dimensional information generation section 34 may recognize the shape of the fixture by using a widely known method, for example, for studying robot vision. Alternatively, the three-dimensional information generation section 34 may detect the position of a player by a method of, for example, using a GPS in a mobile phone or other device carried by the player, acquire information regarding a building at the detected position from retained map information by using the information regarding the detected position and the map information (the map information may be acquired from an external map server if it is accessible), and obtain the information regarding, for example, the shape of the fixture (including, for example, a road if the fixture is placed on a public road).

Furthermore, as regards a person and other moving or deforming target (e.g., a target that varies its posture), the three-dimensional information generation section 34 additionally references information regarding previous real space images (previous processing target images) acquired from the same player-side apparatus 20 and uses a so-called bone tracking technology (a technology for detecting the skeleton of a movable body and the positions and orientations of its joints) in order to detect the position and posture of the moving or deforming target in a real space (the real space as viewed from a player wearing the player-side apparatus 20 providing the processing target images).

Moreover, the three-dimensional information generation section 34 acquires information regarding the position of the recognized target in the real space (e.g., the position of a gravity center point of a building or the position of the head or other predetermined point of a person). Here, it is assumed that the information regarding the position of the target captured in a target image can be obtained from the position information regarding the player and the information regarding the orientation (field of view) of the player, which are acquired by the position acquisition section 33, and is expressed in a global coordinate system indicative of a position within a real space that is to be processed by the information processing system 1.

Upon recognizing targets in a processing target image, the three-dimensional information generation section 34 records information regarding the positions, shapes, and postures of the targets in association with information indicative of the types of the targets, such as information regarding buildings, signboards, doors, ornaments (e.g., dolls and tools), other persons, and vehicles. The positions of the targets are the positions within a real space as viewed from a player wearing the player-side apparatus 20 providing the processing target image, namely, the positions within a space expressible by XYZ orthogonal coordinates that regard the player as the origin and have a Y-axis representing the gravity direction, an X-axis representing the horizontal direction, and a Z-axis representing the depth direction (the normal direction of the base of the viewing frustum of the field of view), which are contained in a two-dimensional plane representative of the field of view of the player. This information regarding the positions, shapes, and postures is used to set the position, shape, and posture of a virtual object in a virtual space that has a size corresponding to the size of a target. This information regarding the positions, shapes, and postures may be information indicative, for example, of gravity center position, shape, and posture.

The three-dimensional information generation section 34 determines virtual objects in a virtual space that respectively correspond to recognized targets. In the present embodiment, the three-dimensional information generation section 34 references the player database, and acquires a group identifier that is associated with display apparatus identification information specifying the player-side apparatus 20 providing the processing target image. The three-dimensional information generation section 34 then determines, on an individual group identifier basis, the types of virtual objects corresponding to at least some targets. That is, in the present embodiment, as regards players identified by the information associated with different group identifiers, the type of a virtual object corresponding to the same target may occasionally vary from one player to another.

For example, the three-dimensional information generation section 34 replaces virtual objects corresponding to the other persons among the recognized targets with virtual player objects (thus the virtual objects corresponding to the other persons change to common types of virtual objects for all the players). Meanwhile, the three-dimensional information generation section 34 replaces, for example, signboards and ornaments among the recognized targets with virtual objects that vary from one group identifier to another. More specifically, the three-dimensional information generation section 34 replaces a player identified by information associated with a group identifier GID of a with a non-player character (NPC) to which information required for playing in a facility is provided. Further, the three-dimensional information generation section 34 replaces a player identified by information associated with a group identifier GID other than a, namely, a group identifier GID, for example, of b or c, with an object (e.g., a bronze statue) irrelevant to the progression of a play in the facility.

Further, based on the group identifier, which is the attribute information regarding a player, the three-dimensional information generation section 34 may also determine the type of a virtual object that replaces a building. Furthermore, the three-dimensional information generation section 34 may reference a game progression database that records the progression of a game on an individual player attribute information basis, and determine the type of a virtual object in accordance with the progression of the game. For example, as regards a player identified by the information associated with a group identifier GID of a, the three-dimensional information generation section 34 may reference the information recorded in the game progression database in association with the group identifier GID of a, and replace the player with a virtual object representative of a building destroyed, for example, by an attack. Meanwhile, as regards a player identified by the information associated with a group identifier GID other than a, namely, a group identifier GID, for example, of b or c, the three-dimensional information generation section 34 may reference the information recorded in the game progression database in association with the group identifier GID, for example, of b or c, and replace the player with a virtual object representative of a pre-destroyed building.

The three-dimensional information generation section 34 further sets a virtual space corresponding to a real space, and generates three-dimensional information representative of a virtual object that corresponds to each recognized target and is disposed at a position within the virtual space corresponding to a position in the real space. In the above instance, virtual space setup may be performed by presetting a virtual space corresponding to the whole real space where a player can move or may be performed by successively setting a virtual space corresponding to the real space within a field of view of the player each time the player moves to place a region in the real space within the field of view. As already mentioned, in the present embodiment, the type of a virtual object corresponding to a target may vary with the player attribute information (vary from one group identifier to another in the present example). Therefore, the three-dimensional information generation section 34 generates the three-dimensional information for each piece of player attribute information. The three-dimensional information generation section 34 sets, within a virtual space, the position, shape, and posture of a virtual object having a size corresponding to the size of a target by using the information regarding the position, shape, and posture of the target that is recognized based on real space image information.

The field-of-view image generation section 35 generates a field-of-view image by rendering an image of a virtual space corresponding to a real space within the field of view of each player. More specifically, the field-of-view image generation section 35 successively generates the field-of-view image concerning each player. When generating a field-of-view image concerning a player, the field-of-view image generation section 35 acquires player attribute information regarding the player (referred to as the target player) providing the field-of-view image, and acquires three-dimensional information that is generated by the three-dimensional information generation section 34 in relation to the player attribute information. Here, the player attribute information is assumed to be a group identifier. Therefore, the field-of-view image generation section 35 references a group identifier that is recorded in the player database in association with the player identifier of the target player, and acquires three-dimensional information that is generated by the three-dimensional information generation section 34 in relation to the group identifier.

The field-of-view image generation section 35 further acquires information regarding the position and orientation of the target player, acquires information regarding the position of the eyes of the target player in the global coordinate system, disposes a virtual camera at a position within a virtual space that corresponds to the position of the eyes, and renders a virtual space image from the virtual camera. This process is widely known and will not be described in detail here. The field-of-view image generation section 35 outputs the rendered field-of-view image together with the player identifier of the target player.

The transmission control section 36 transmits the field-of-view image concerning each player, which is generated by the field-of-view image generation section 35, to the player-side apparatus 20 worn by the associated player. More specifically, the transmission control section 36 receives the field-of-view image and player identifier outputted from the field-of-view image generation section 35, and acquires display apparatus identification information that is recorded in the player database in association with the player identifier. The transmission control section 36 transmits the received field-of-view image to the player-side apparatus 20 identified by the acquired display apparatus identification information.

An example of the information processing system 1 according to the present embodiment includes the above-described elements and operates as described below. The following example assumes that players Pa and Pb belong to a group having a group identifier GID of a, and that a player Pc belongs to a group having a group identifier GID of b. It is also assumed that, as regards the players having the group identifier GID of a as the player attribute information, the game progression database contains recorded information indicating that the destruction of a building X is terminated, and that, as regards the player having the group identifier GID of b, the game progression database contains recorded information indicating that the destruction of the building X is not terminated.

Figure 4:
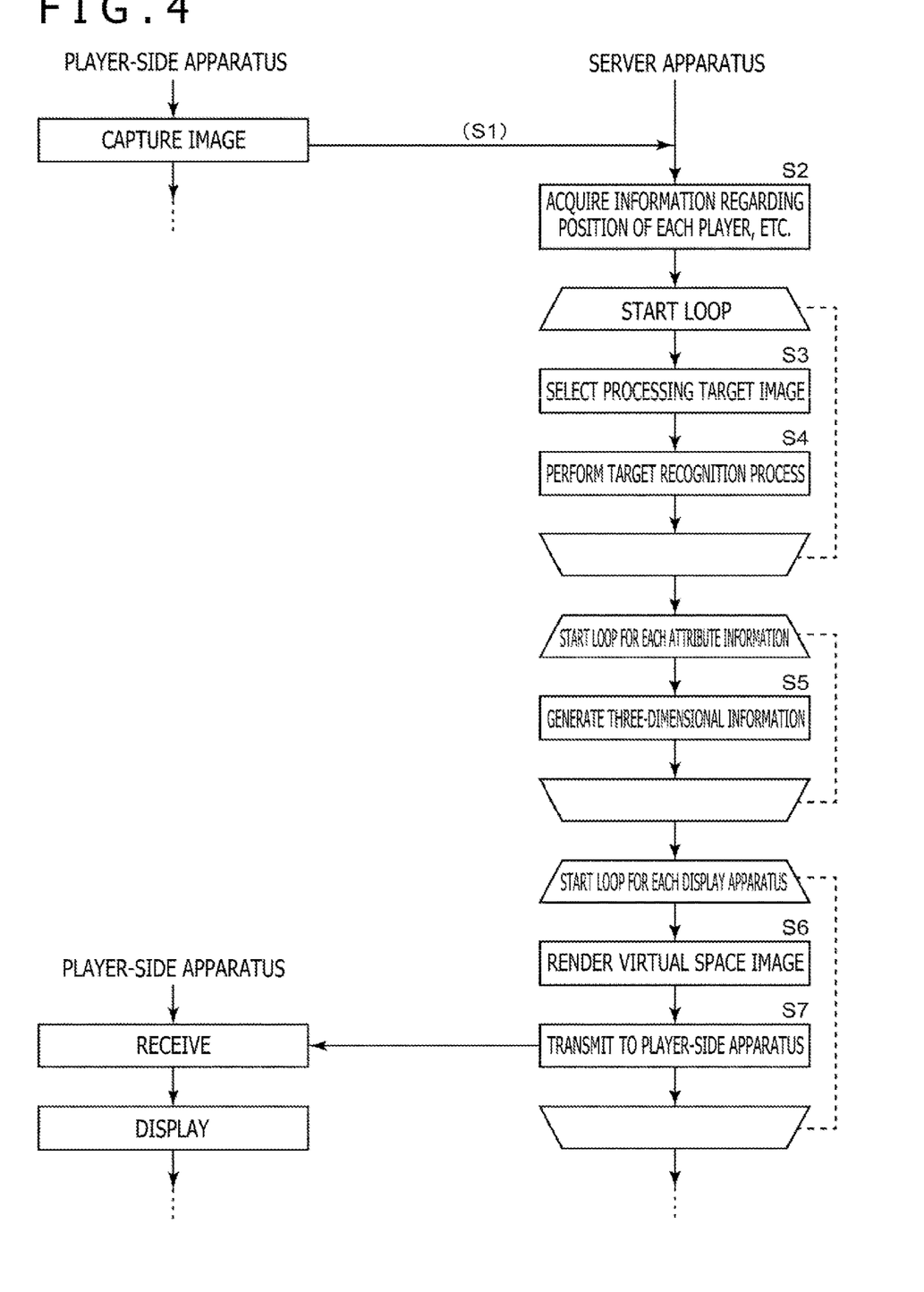
FIG. 4 is a flowchart illustrating exemplary operations of the information processing system 1 according to the embodiment of the present invention.

The server apparatus 10, as illustrated in FIG. 4, acquires, from the player-side apparatus 20 worn by each player, image data (real space image) captured by the imaging section 23 included in the player-side apparatus 20 (step S1). Further, the server apparatus 10 acquires information indicative of the position and orientation of each player (step S2).

Based on the real space image acquired from the player-side apparatus 20 worn by each player, the server apparatus 10 generates three-dimensional information representative of a virtual space containing a disposed virtual object corresponding to a target in a real space that is included in the real space image. In this instance, more specifically, the server apparatus 10 sequentially selects, as a processing target image, real space images acquired from the player-side apparatus 20 worn by each player (step S3), recognizes targets (e.g., buildings, signboards, door fixtures, and other persons) included in the processing target image, and additionally recognizes, for example, the shapes and postures of the targets (target recognition process (step S4)).

The server apparatus 10 performs steps S3 and S4 on image information acquired from each player-side apparatus 20, and repeats the subsequent processing on each piece of player attribute information. That is, the server apparatus 10 determines a virtual object in a virtual space that corresponds to each recognized target, disposes the determined virtual object in the virtual space, and generates three-dimensional information for each piece of player attribute information (a group identifier in the present example) (step S5). In this instance, the server apparatus 10 references the player database and the game progression database. Further, the server apparatus 10 sets a virtual player object in replacement of a virtual object corresponding to a target identified as another person existing in the field of view of a player. Meanwhile, the server apparatus 10 sets a particular type of virtual object determined for each group identifier in replacement of a signboard, an ornament, or other similar recognized target.

When, for example, a player who has not terminated the destruction of the building X is set so that an ornament Y or ornament Z in the vicinity of the building X is to be replaced by an NPC guiding the destruction of the building X, the server apparatus 10 references such a setting. In a case where a player wearing the player-side apparatus 20 having provided a processing target image is a player Pc belonging to a group that is identified by the group identifier b and has not terminated the destruction of the building X, the server apparatus 10 replaces either one of the ornaments Y and Z, which are in the vicinity of the building X (e.g., randomly chooses either one), with an NPC guiding the destruction of the building X, and disposes the NPC at a corresponding position within a virtual space that is associated with the group identifier b.

Meanwhile, in a case where a player wearing the player-side apparatus 20 having provided a processing target image is either one of the players Pa and Pb, who belong to a group that is identified by the group identifier a and has terminated the destruction of the building X, the server apparatus 10 replaces either one of the ornaments Y and Z, which are positioned in the vicinity of the building X, with a simple bronze statue or the like instead of an NPC guiding the destruction of the building X, and disposes the bronze statue or the like at a corresponding position within a virtual space that is associated with the group identifier a.

Based on the three-dimensional information generated for each group identifier, the server apparatus 10 generates a field-of-view image by rendering an image of a virtual space corresponding to a real space within the field of view of each player (step S6). The server apparatus 10 then transmits the generated field-of-view image to the player-side apparatus 20 worn by the associated player (step S7).

The present embodiment performs the above-described operations. Therefore, for example, an actually existing person is displayed after being replaced by a virtual player object corresponding to the person in the same manner as for each player. However, at least a part of a fixture is displayed after being replaced by a virtual object that may vary from one group to another. That is, in an example of the present embodiment, the field-of-view image provided to the players Pa and Pb in a group having the group identifier a is such that a target Y or a target Z is replaced by a bronze statue or the like and not replaced by an NPC guiding the progression of a game. Therefore, the players do not come by the target Y or Z to receive a guidance. Meanwhile, the field-of-view image provided to the player Pc in a group having the group identifier b is such that the target Y or Z is displayed as an NPC guiding the progression of a game. Therefore, the player Pc comes by the target Y or Z to receive a guidance. This makes it possible to prevent the congestion of players Pa, Pb, and Pc that may occur when the same virtual object is presented to the players.

Further, in the present example, as regards another player Pd belonging to another group (e.g., a group having a group identifier GID of c), randomly selected one of the ornaments Y and Z in the vicinity of the building X is similarly replaced by an NPC guiding the progression of a game even if the group is in a state where the building X is not destroyed in the progression of a game. In this instance, however, either one of the ornaments Y and Z is randomly selected. This reduces the possibility of an ornament placed at the same location as for the player Pc being replaced by the same NPC. In this manner, the present embodiment makes it possible to prevent the congestion of players that may occur when the players gather at the same location.

<Example of Processing in Player-Side Apparatus>

The foregoing description deals with an example in which the control section 11 of the server apparatus 10 receives image data captured by the imaging section 23 of the player-side apparatus 20 from the player-side apparatus 20, and, based on the received image data (real space image), performs a process, for example, of generating three-dimensional information representative of a virtual object disposed in a virtual space in correspondence with a target in a real space that is included in the real space image. However, the present embodiment is not limited to such an example. Alternatively, the control section 21 of the player-side apparatus 20 may generate the three-dimensional information based on the image data, and perform rendering and other processes. In such a case, the control section 11 of the server apparatus 10 determines, for each player, information indicating the type of a virtual object corresponding to a target in a real space at the time of three-dimensional information generation in accordance with player attribute information, transmits the determined information to the player-side apparatus 20. The player-side apparatus 20 then receives the information, and generates, based on the received information, three-dimensional information representative of a disposed virtual object corresponding to a target in a real space that is included in a real space image.

Figure 5:
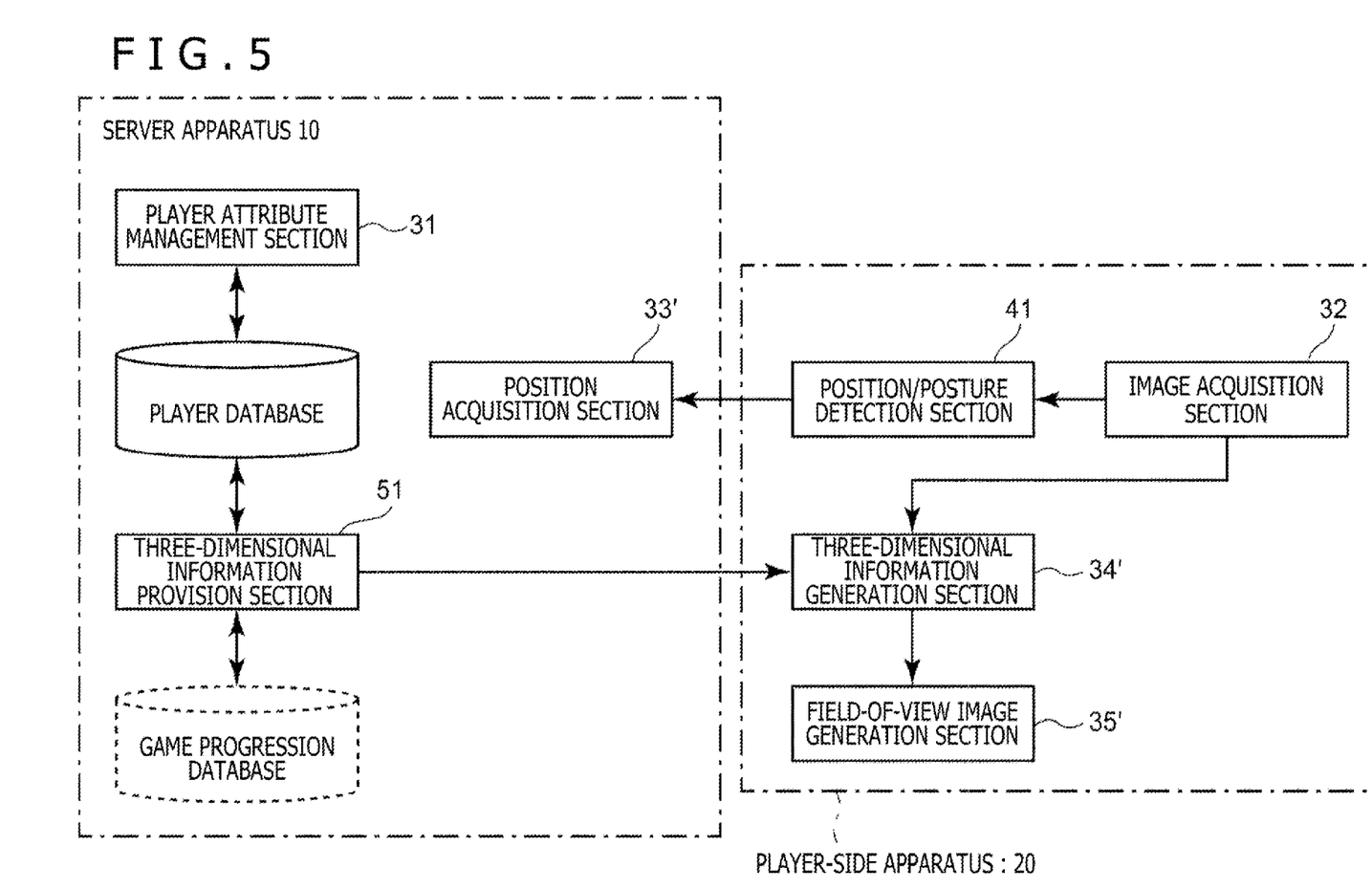
FIG. 5 is a functional block diagram illustrating an example of the information processing system 1 according to the embodiment of the present invention.

Stated differently, in the present example of the present embodiment, the control section 11 of the server apparatus 10 functionally includes, as illustrated in FIG. 5, a player attribute management section 31, a position acquisition section 33', and a three-dimensional information provision section 51 instead of the functional elements illustrated in FIG. 2. Further, as illustrated in FIG. 5, the control section 21 of the player-side apparatus 20 functionally includes an image acquisition section 32, a position/posture detection section 41, a three-dimensional information generation section 34', and a field-of-view image generation section 35'. Elements identical with the earlier-described ones are designated by the same reference numerals as their counterparts and will not be redundantly described.

The image acquisition section 32 acquires, for example, image data (real space image) captured by the imaging section 23 included in the player-side apparatus 20 itself. The position/posture detection section 41 acquires information indicative of the position, orientation, and posture of each player. The position/posture detection section 41 may also acquire the information regarding, for example, the position, orientation, and posture of a player in accordance with an image acquired by the image acquisition section 32 (for example, the SLAM technology may be used). Further, in another example of the present embodiment, the position information may be acquired by a GPS or other positioning system through the use, for example, of a mobile phone separately possessed by each player. In still another example of the present embodiment, a tag for transmitting a beacon for proximity communication may be disposed at various places within a facility in order to detect a position in accordance with the beacon received from the tag and its intensity, and the orientation of a player may be detected by detecting the posture of the player with a tilt or orientation sensor (not depicted) attached to the player-side apparatus 20. Various methods are available to acquire the information indicative, for example, of the position, orientation, and posture of a player. Therefore, further details are not given here.

Based on a real space image acquired by the image acquisition section 32, the three-dimensional information generation section 34' generates three-dimensional information representative of a virtual space including a virtual object corresponding to a target that is positioned in a real space and included in the real space image.

In the present example of the present embodiment, based on the acquired real space image, the three-dimensional information generation section 34' generates the three-dimensional information that serves as a source for an image to be presented to the display apparatus 24. The three-dimensional information generation section 34' first regards the real space image acquired by the image acquisition section 32 as a processing target image, and not only recognizes targets (e.g., buildings, signboards, door fixtures, and other persons) included in the processing target image, but also recognizes, for example, the shapes and postures of the targets.

In this instance, also, in a case where the system according to the present embodiment is used, for example, in a facility, a computer-readable code image (e.g., two-dimensional bar code) may be attached in advance to a building, a signboard, or other fixture so as to let the three-dimensional information generation section 34' detect the code image from the processing target image and recognize the fixture. In such a case, when unique identification information is preassigned to each fixture, it is possible to retain shape and other information beforehand as database and allow the three-dimensional information generation section 34' to acquire and use such databased information.

Further, in a case where the information processing system 1 according to the present embodiment is used, for example, on a public road or other locations not managed by the manager of the server apparatus 10 while no computer-readable code image is attached to such locations, the three-dimensional information generation section 34' may recognize the shape, for example, of a fixture by using a widely known method for studying robot vision or the like. Alternatively, the three-dimensional information generation section 34' may detect the position of a player by a method of, for example, using a GPS in a mobile phone or other device carried by the player, acquire information regarding a building at the detected position from retained map information by using the information regarding the detected position and the map information (the map information may be acquired from an external map server if it is accessible), and obtain the information regarding, for example, the shape of the fixture (including, for example, a road if the fixture is placed on a public road).

Furthermore, as regards a person and other moving or deforming target (e.g., a target that varies its posture), the three-dimensional information generation section 34' additionally references information regarding previous real space images (previous processing target images) acquired in the past by the image acquisition section 32, and uses a so-called bone tracking technology (a technology for detecting the skeleton of a movable body and the positions and orientations of its joints) in order to detect the position and posture of the moving or deforming target in a real space (the real space as viewed from a player wearing the player-side apparatus 20).

Moreover, the three-dimensional information generation section 34' acquires information regarding the position of the recognized target in the real space (e.g., the position of a gravity center point of a building or the position of the head or other predetermined point of a person). Here, it is assumed that the information regarding the position of the target captured in a target image can be obtained from the position information regarding the player and the information regarding the orientation (field of view) of the player, which are acquired by the position/posture detection section 41, and is expressed in a global coordinate system indicative of a position within a real space that is to be processed by the information processing system 1.

Upon recognizing targets in a processing target image, the three-dimensional information generation section 34' transmits information indicative of the positions, shapes, and postures of the targets to the server apparatus 10 in association with the types of the targets, such as buildings, signboards, doors, ornaments (e.g., dolls and tools), other persons, and vehicles. The positions of the targets are the positions within a real space as viewed from a player wearing the player-side apparatus 20 providing the processing target image, namely, the positions within a space expressible by XYZ orthogonal coordinates that regard the player as the origin and have a Y-axis representing the gravity direction, an X-axis representing the horizontal direction, and a Z-axis representing the depth direction (the normal direction of the base of the viewing frustum of the field of view), which are contained in a two-dimensional plane representative of the field of view of the player. Here, the information regarding the positions, shapes, and postures is used to set the position, shape, and posture of a virtual object in a virtual space that has a size corresponding to the size of a target. This information may be information indicative, for example, of gravity center position, shape, and posture.

The three-dimensional information generation section 34' further acquires, from the server apparatus 10, information identifying a virtual object corresponding to each target in the processing target image (e.g., information regarding the three-dimensional shape, position, and posture of the virtual object).

The three-dimensional information generation section 34' then sets a virtual space corresponding to a real space, and generates three-dimensional information representative of a virtual object that corresponds to each recognized target acquired from the server apparatus 10 and is disposed at a position within the virtual space corresponding to a position in the real space. The three-dimensional information generation section 34 sets, within the virtual space, the position, shape, and posture of a virtual object having a size corresponding to the size of each target by using the information indicative of the position, shape, and posture of a target that are recognized based on real space image information.

The field-of-view image generation section 35' generates a field-of-view image by rendering an image of a virtual space corresponding to a real space within the field of view of a player. More specifically, the field-of-view image generation section 35' acquires three-dimensional information generated by the three-dimensional information generation section 34', additionally acquires information regarding the position, orientation, and posture of the player and information regarding the position of the eyes of a target player in the global coordinate system, disposes a virtual camera at a position within a virtual space that corresponds to the position of the eyes, and renders a virtual space image from the virtual camera. This process is widely known and will not be described in detail here. The field-of-view image generation section 35' outputs the rendered field-of-view image to the display apparatus 24 for display purposes.

Further, in the present example of the present embodiment, the position acquisition section 33' in the control section 11 of the server apparatus 10 acquires information indicative of position, orientation, and posture from the player-side apparatus 20 of each player. The position acquisition section 33' then records the acquired information in association with a player identifier that identifies a player wearing the player-side apparatus 20 acting as an information acquisition source.

The three-dimensional information provision section 51 in the control section 11 of the server apparatus 10 determines a virtual object in a virtual space that corresponds to a target recognized by the player-side apparatus 20 of each player. In the present embodiment, the three-dimensional information provision section 51 references the player database, and acquires a group identifier associated with display apparatus identification information identifying the player-side apparatus 20 acting as a processing target image provision source. Then, for each group identifier, the three-dimensional information provision section 51 determines the types of virtual objects corresponding to at least some targets. That is, in the present embodiment, as regards players identified by information associated with different group identifiers, the types of virtual objects corresponding to the same target may differ from each other in some cases.

For example, the three-dimensional information provision section 51 sets a virtual player object in replacement of a virtual object corresponding to another person among targets recognized by the player-side apparatus 20 (thus, the set virtual player object is of a type common to all the players). Meanwhile, the three-dimensional information provision section 51 replaces, for example, signboards and ornaments among the recognized targets with a virtual object that may vary from one group identifier to another. The three-dimensional information provision section 51 replaces a player identified by information associated with a group identifier GID of a with an NPC to which information required for playing in a facility is provided. The three-dimensional information provision section 51 replaces a player identified by information associated with a group identifier GID other than a, namely, a group identifier GID, for example, of b or c, with an object (e.g., a bronze statue) irrelevant to the progression of a play in the facility.

Further, as regards a building, the three-dimensional information provision section 51 may also determine, based on a group identifier serving as the player attribute information, the type of a virtual object that replaces the building. Furthermore, the three-dimensional information provision section 51 may reference the game progression database that records the progression of a game on an individual player attribute information basis, and determine the type of a virtual object in accordance with the progression of the game. For example, as regards a player identified by the information associated with a group identifier GID of a, the three-dimensional information provision section 51 may reference the information recorded in the game progression database in association with the group identifier GID of a, and replace the player with a virtual object representative of a building destroyed, for example, by an attack. Meanwhile, as regards a player identified by the information associated with a group identifier GID other than a, namely, a group identifier GID, for example, of b or c, the three-dimensional information provision section 51 may reference the information recorded in the game progression database in association with the group identifier GID, for example, of b or c, and replace the player with a virtual object representative of a pre-destroyed building. This replacement process is the same as the one performed in the three-dimensional information generation section 34.

As described above, for each identified target in a real space and for each piece of player attribute information, the three-dimensional information provision section 51 generates information identifying a virtual object to be set in replacement of the target (generates information indicative of the shape, position, and posture of the virtual object).

The three-dimensional information provision section 51 then outputs for transmission to the player-side apparatus 20 of each player, information identifying a virtual object for each target in the real space that corresponds to the player attribute information regarding each player.

As described above, in the present embodiment, either the server apparatus 10 or the player-side apparatus 20 may include an element acting as three-dimensional information generation means for generating, based on a captured real space image, three-dimensional information representative of a virtual object disposed in a virtual space that corresponds to a target positioned in a real space and included in the captured real space image, and an element acting, for each player wearing a display apparatus, as means for rendering a virtual space image represented by the generated three-dimensional information as viewed from a computed location of an associated player and generating a field-of-view image for the associated player.

<Process of Referencing Type of Virtual Object Set for Other Player Attribute Information>

The foregoing examples assume that, in a case where a plurality of targets in a real space are to be presumably replaced by a predetermined type of virtual object (e.g., an NPC), the target to be replaced by disposing the predetermined type of virtual object instead is determined randomly for each group identifier (player attribute information). However, the present embodiment is not limited to such a replacement scheme. An alternative is to let the server apparatus 10 acquire, for example, information indicating whether or not the predetermined type of virtual object is currently disposed in replacement of a group identifier or information indicating the number of such group identifiers for each target, reference the acquired information, select a target that is not currently replaced by the predetermined type of virtual object for the other group identifiers, and dispose the predetermined type of virtual object in replacement of the selected target. Another alternative is to let the server apparatus 10 select a target for which the smallest number of other group identifiers are replaced by the predetermined type of virtual object, and dispose the predetermined type of virtual object in replacement of the selected target.

<Example of Virtual Player Object>

In an example of the present embodiment, it is conceivable that a person wearing clothes in accordance with an instruction from the manager may be displayed as a virtual player object. For example, the server apparatus 10 recognizes a face portion of an imaged person, sets the recognized face portion as a texture for the head of a virtual player object, select, for example, clothes from a plurality of types of clothes preselected by the manager, and sets the selected clothes as the clothes to be worn by the virtual player object. In a case where the system according to the present embodiment is used, for example, in a facility with the theme of a past era, the server apparatus 10 sets clothes suitable for the past era.

<Interaction with Real Target>

Further, the server apparatus 10 according to the present embodiment may perform a process, for example, of exercising control based on the player attribute information in order to determine whether or not an operation can be performed on a real substance disposed in a real space. That is, in an example of the present embodiment, the server apparatus 10 acquires information regarding a real substance disposed in a real space, and performs a predetermined process on the acquired information regarding the real substance disposed in the real space.

More specifically, as regards a target that is disposed in a real space and recognized as a door, the server apparatus 10 may reference, with respect to each group identifier serving as the player attribute information, information regarding, for example, the progression of a game related to a group identified by a particular group identifier, and display a virtual object representing a passable door for a player belonging to a group that has completed a mission within a predetermined game, or display a virtual object hardly recognizable as a passable door (e.g., a virtual object representing a simple wall or virtual objects representing a door and an NPC acting as a gatekeeper) for a player belonging to a group that has not completed the mission.

Further, in the above case, the door in the real space may be actually provided with a key that can be locked and unlocked under the control of the server apparatus 10, and the server apparatus 10 may exercise control to lock the door when the door is approached by a player belonging to a group disabled to pass the door. Meanwhile, when the door is approached by a player belonging to a group enabled to pass the door, the server apparatus 10 may exercise control to unlock the door. The present embodiment configured as described above makes it possible to set an object representative of a door that can be passed only by players belonging to a specific group.

<Provision of Voice Information>

Furthermore, the foregoing examples of the present embodiment assume that the server apparatus 10 provides a field-of-view image to the player-side apparatus 20. However, the present embodiment is not limited to such a scheme. The server apparatus 10 may provide each player wearing the player-side apparatus 20 with voice information based on three-dimensional information corresponding to the player attribute information.

For example, in a case where a player belonging to a group is near a target in a real space that is replaced by an NPC for the group, the server apparatus 10 may deliver, to the player, for example, voice information and sound effects (SE) that are preset in association with the NPC. In this example, the player-side apparatus 20 may include, for instance, a speaker that receives the voice information transmitted from the server apparatus 10 and emits a sound based on the received voice information. In this manner, sounds as well as images can be varied from one group to another, that is, varied with the player attribute information.

<Virtual Object Representing No Existing Real Substance>

Moreover, the foregoing examples assume that the server apparatus 10 disposes a virtual object corresponding to a target in a real space at a position within a virtual space that corresponds to the position of the target. However, the present embodiment is not limited to such a scheme. Alternatively, the server apparatus 10 may generate the three-dimensional information by disposing, in a virtual space, a virtual object representing no existing target in a real space (referred to as a pure virtual object).

In the above exemplary case, virtual space coordinates where the pure virtual object can be disposed are predetermined, and then whether or not to dispose the pure virtual object is determined based on player attribute information (e.g., based on information regarding the progression of a game associated with the player attribute information).

<Event Involving Motion>

In a case where a player performs a play involving a relatively significant motion (e.g., in a case where a player wields a sword during a play), inter-player collision should preferably be avoided by preventing other players irrelevant to the play from coming close to such a moving player.

Accordingly, in a certain example of the present embodiment, the server apparatus 10 may retain information for identifying whether or not each player is performing a play involving a relatively significant motion. As regards a player performing a play involving a relatively significant motion, the server apparatus 10 may generate three-dimensional information as a virtual object representative of a building or ornament occupying a predetermined area (e.g., an area having a radius of 3 meters) centered around the position of the player instead of using, as a virtual character object, a virtual object in a virtual space that corresponds to the player. Alternatively, as regards a player performing a play involving a relatively significant motion, the server apparatus 10 may use, as a virtual character object, a virtual object in a virtual space that corresponds to the player, and dispose a virtual object indicating no trespassing, such as a curtain or a rope indicative of a keep-out line, at a predetermined distance (e.g., a radius of 3 meters) from the position of the player.

<Example where Some Processing Is Performed in Display Apparatus>

Further, the foregoing description of the present embodiment assumes that the server apparatus 10 performs rendering based on the three-dimensional information in order to generate a field-of-view image to be provided to the player-side apparatus 20 of each player. In the present embodiment, however, this field-of-view image generation process based on rendering may alternatively be performed by the player-side apparatus 20. In the present example, the control section 11 of the server apparatus 10 does not functionally include the field-of-view image generation section 35, and transmits, to the player-side apparatus 20, three-dimensional information related to the player attribute information regarding a relevant player, which is generated by the three-dimensional information generation section 34.

Then, in the present example, the control section 21 of the player-side apparatus 20 not only acquires the three-dimensional information from the server apparatus 10, but also determines information indicative of the position of the eyes of a player within a virtual space that corresponds to the position of the eyes of the player in a real space. Subsequently, the control section 21 disposes a virtual camera at a position within the virtual space that corresponds to the position of the eyes, renders a virtual space image represented by the acquired three-dimensional information as viewed from the virtual camera, and outputs the rendered virtual space image to the display apparatus 24.

<Disposition of Virtual Object according to Instructions>

Further, in a certain example of the present embodiment, the manager may externally operate the manager terminal 30 in order to instruct the server apparatus 10 to dispose a virtual object. More specifically, the server apparatus 10 receives, from the manager terminal 30, an instruction for disposing a virtual object in a virtual space. The instruction includes, for example, coordinate information indicative of a position within the virtual space where the virtual object is to be disposed and information regarding a three-dimensional model of the virtual object (information indicative, for example, of a three-dimensional shape, the texture of its surface, colors, and patterns). Additionally, the instruction may include, for example, information for varying the posture of the virtual object (animation information).

In accordance with the instruction, the server apparatus 10 disposes the designated virtual object at the designated position within the virtual space. The coordinate information included in the instruction need not always be coordinate information, but may be information for designating a virtual object already set in the virtual space in correspondence with a target disposed in a real space (this virtual object is referred to as the existing object). In this case, the server apparatus 10 replaces the existing object designated by the information with the designated virtual object.

<Coexistence with Persons Wearing No Display Apparatus>

Further, persons not wearing the player-side apparatus 20 may be within a real space that is to be processed by the information processing system 1 according to the present embodiment. For example, in a real space within a facility, also, a visitor not wearing the player-side apparatus 20 may coexist with a player wearing the player-side apparatus 20. In this case, for the player wearing the player-side apparatus 20, the visitor not wearing the player-side apparatus 20 is also displayed as a virtual character in a virtual space (the process of replacing with a virtual character remains unchanged no matter whether or not the player-side apparatus 20 is worn). This enables the player to move without colliding with the visitor not wearing the player-side apparatus 20.

Furthermore, a target disposed in a real space is replaced by a virtual object in a virtual space. Therefore, even visitors not wearing the player-side apparatus 20 are able to view dolls and other targets disposed in the real space. Consequently, for example, the progression of a player's game will not be obstructed by allowing the visitors not wearing the player-side apparatus 20 to occupy places where the dolls are located.

REFERENCE SIGNS LIST

1 Information processing system, 10 Server apparatus, 11 Control section, 12 Storage section, 13 Communication section, 20 Player-side apparatus, 21 Control section, 22 Storage section, 23 Imaging section, 24 Display apparatus, 25 Communication section, 30 Manager terminal, 31 Player attribute management section, 32 Image acquisition section, 33, 33' Position acquisition section, 34, 34' Three-dimensional information generation section, 35, 35' Field-of-view image generation section, 36 Transmission control section, 41 Position/posture detection section, 51 Three-dimensional information provision section.

The invention claimed is:

1. An information processing system comprising:
three-dimensional information generation means for generating three-dimensional information indicative of a virtual object disposed in a virtual space corresponding to a real space;
means for rendering, for each of players, a virtual space image represented by the generated three-dimensional information and generating a field-of-view image concerning the associated player; and
means for presenting the field-of-view image concerning each of the players to the associated player,
wherein the players are simultaneously co-located in the real space,
wherein a type of the virtual object included in the generated three-dimensional information is determined based on player attribute information prescribed for each of the players and a group ID of the players,
wherein a first fixed location of a first virtual object for a first group of players in the virtual space is different than a second fixed location of a second virtual object for a second group of players in the virtual space,
wherein the first fixed location in the virtual space corresponds to a first location in the real space, and
wherein the second fixed location in the virtual space corresponds to a second location in the real space, and
wherein the first location is different than the second location.

2. The information processing system according to claim 1,
wherein the first virtual object is different than the second virtual object.

3. An information processing system comprising:
a server apparatus;
a display apparatus that presents an image to a player; and
an attribute information database that retains player attribute information regarding each of players,
wherein the server apparatus acquires information regarding a thing in a real space, and performs computations based on the acquired information to obtain specific information regarding the thing in a virtual space,
one of the server apparatus and the display apparatus includes:
three-dimensional information generation means for generating, based on the acquired information regarding the thing in the real space, three-dimensional information indicative of a virtual object disposed in a virtual space, and
means for rendering, for each of the players, a virtual space image represented by the generated three-dimensional information and generating a field-of-view image for each of the players,
wherein the players are simultaneously co-located in the real space,
the display apparatus displays a field-of-view image concerning a player viewing the display apparatus, and
a type of the virtual object included in the three-dimensional information is determined based on the player attribute information prescribed for each of the players and a group ID of the players,
wherein a first fixed location of a first virtual object for a first group of players in the virtual space is different than a second fixed location of a second virtual object for a second group of players in the virtual space,
wherein the first fixed location in the virtual space corresponds to a first location in the real space, and
wherein the second fixed location in the virtual space corresponds to a second location in the real space, and
wherein the first location is different than the second location.

4. The information processing system according to claim 3,
wherein, in accordance with an externally inputted instruction and in association with the player attribute information regarding a player, the three-dimensional information generation means disposes, in the virtual space, a virtual objet to be presented to a player associated with the prescribed player attribute information.

5. The information processing system according to claim 3,
wherein the server apparatus determines a material that a real object disposed in a real space is composed of as the information regarding a thing in the real space, and the acquired information regarding the material is used to select the type of virtual object.

6. The information processing system according to claim 3,
wherein the three-dimensional information generation means acquires information regarding a person located in a real space as the information regarding a thing in the real space, and generates, based on the information regarding the person, three-dimensional information representative of a virtual player object disposed in the virtual space in correspondence with the person.

7. A player-side apparatus comprising:
means for generating, based on information regarding a thing in a real space, for each of players possessing a display apparatus, three-dimensional information regarding a virtual space where a virtual object is disposed corresponding to the real space,
wherein the players are simultaneously co-located in the real space;
means for rendering an image of a virtual space represented by the three-dimensional information and generating a field-of-view image concerning the associated player; and
means for outputting the generated field-of-view image concerning the associated player to the display apparatus possessed by the player,
wherein the means for generating the three-dimensional information determines a type of virtual object corresponding to the thing in the real space in accordance with player attribute information prescribed for each of the players and a group ID,
wherein a first fixed location of a first virtual object for a first group of players in the virtual space is different than a second fixed location of a second virtual object for a second group of players in the virtual space,
wherein the first fixed location in the virtual space corresponds to a first location in the real space, and
wherein the second fixed location in the virtual space corresponds to a second location in the real space, and
wherein the first location is different than the second location.

8. A control method of operating a computer to control an information processing system where a display apparatus possessed by a player displays a field-of-view image concerning the player possessing the display apparatus, the control method comprising:
by three-dimensional information generation means, generating, based on information regarding a thing in a real space, three-dimensional information indicative of a virtual object disposed in a virtual space corresponding to the real space,
wherein the players are simultaneously co-located in the real space;
by computation means, acquiring position information regarding a position in the real space of a player possessing the display apparatus for presenting an image to the player, and computing the location of the player in the virtual space in accordance with the acquired position information;
for each of players wearing the display apparatus, by field-of-view image generation means, rendering a virtual space image represented by the generated three-dimensional information and generating a field-of-view image concerning the associated player,
wherein the virtual space is the same for each of the players and corresponds to the real space; and
by setting means, determining, based on player attribute information prescribed for each of players, a type of the virtual object to be included in the three-dimensional information,
wherein a first fixed location of a first virtual object for a first group of players in the virtual space is different than a second fixed location of a second virtual object for a second group of players in the virtual space,
wherein the first fixed location in the virtual space corresponds to a first location in the real space, and
wherein the second fixed location in the virtual space corresponds to a second location in the real space, and
wherein the first location is different than the second location.

* * * * *